United States Patent
Kamal et al.

(10) Patent No.: US 10,832,229 B2
(45) Date of Patent: Nov. 10, 2020

(54) TRANSLATING DATA SIGNALS BETWEEN A FRONTEND INTERFACE AND A BACKEND SERVER

(71) Applicant: MasterCard International Incorporated, Purchase, NY (US)

(72) Inventors: Mohammed Kamal, Troy, MI (US); Theresa LaRosa, Noblesville, IN (US); David Lynn, O'Fallon, IL (US); Tom A. Aprik, Royal Oak, MI (US)

(73) Assignee: MasterCard International Incorporated, Purchase, NY (US)

( * ) Notice: Subject to any disclaimer, the term of this patent is extended or adjusted under 35 U.S.C. 154(b) by 513 days.

(21) Appl. No.: 14/958,170

(22) Filed: Dec. 3, 2015

(65) Prior Publication Data
US 2017/0161694 A1 Jun. 8, 2017

(51) Int. Cl.
*G06Q 20/02* (2012.01)
*G06F 16/25* (2019.01)
*H04L 29/06* (2006.01)
*G06Q 20/40* (2012.01)
*H04L 29/08* (2006.01)

(52) U.S. Cl.
CPC ......... *G06Q 20/027* (2013.01); *G06F 16/258* (2019.01); *G06Q 20/4016* (2013.01); *H04L 67/2823* (2013.01); *H04L 67/42* (2013.01)

(58) Field of Classification Search
CPC .... G06Q 20/027; G06Q 20/405; G06Q 20/10; G06Q 20/40975; H04L 67/04; G06F 16/275
USPC .......................................................... 709/249
See application file for complete search history.

(56) References Cited

U.S. PATENT DOCUMENTS

| | | | |
|---|---|---|---|
| 6,836,795 B2 | 12/2004 | Soderberg et al. | |
| 6,836,796 B2 | 12/2004 | Schwartz et al. | |
| 6,865,605 B1 | 3/2005 | Soderberg et al. | |
| 7,076,541 B1 | 7/2006 | Burstein et al. | |
| 7,346,718 B2* | 3/2008 | Sakamura | G06K 7/00 235/380 |
| 7,849,219 B2 | 12/2010 | Rose | |
| 8,126,808 B2* | 2/2012 | Reid | G06Q 20/04 235/380 |
| 8,180,845 B2 | 5/2012 | Brendle et al. | |
| 8,185,460 B1 | 5/2012 | Vaughan | |
| 8,195,823 B2 | 6/2012 | Thornton et al. | |
| 8,346,732 B1 | 1/2013 | Nasre | |
| 8,374,932 B2 | 2/2013 | Marchetti et al. | |
| 8,510,162 B1* | 8/2013 | Dobelstein | G06Q 30/0229 235/375 |
| 8,954,522 B1 | 2/2015 | Madnani et al. | |

(Continued)

OTHER PUBLICATIONS

PCT International Search Report and Written Opinion, Application No. PCT/US2016/061998, dated Feb. 16, 2017, 11 pps.

*Primary Examiner* — Samica L Norman
*Assistant Examiner* — Mary M Gregg
(74) *Attorney, Agent, or Firm* — Armstrong Teasdale LLP

(57) ABSTRACT

A data signal translation device for translating a data signal between a frontend interface and a backend server that is in communication with a processing network is described. Additionally, a method and a computer-readable storage medium for translating a data signal between a frontend interface and a backend server that is in communication with a processing network are described.

22 Claims, 8 Drawing Sheets

(56) References Cited

U.S. PATENT DOCUMENTS

| | | | |
|---|---|---|---|
| 2002/0120787 A1* | 8/2002 | Shapiro | G06F 9/5055 |
| | | | 719/311 |
| 2002/0143764 A1 | 10/2002 | Martin et al. | |
| 2003/0204612 A1 | 10/2003 | Warren | |
| 2004/0205731 A1 | 10/2004 | Junkermann | |
| 2005/0137972 A1* | 6/2005 | Krumlauf | G06Q 20/04 |
| | | | 705/40 |
| 2006/0274761 A1 | 12/2006 | Error et al. | |
| 2007/0077665 A1* | 4/2007 | Bump | G05B 19/41845 |
| | | | 438/14 |
| 2007/0179939 A1* | 8/2007 | O'Neil | G06F 16/252 |
| 2008/0189706 A1 | 8/2008 | Abrink et al. | |
| 2009/0276481 A1* | 11/2009 | Anna | H04L 67/28 |
| | | | 709/201 |
| 2010/0057554 A1* | 3/2010 | Lanford | G06Q 20/20 |
| | | | 705/14.38 |
| 2010/0057744 A1* | 3/2010 | Lock | G06F 17/30557 |
| | | | 707/E17.032 |
| 2010/0150138 A1* | 6/2010 | Bjorsell | H04L 63/00 |
| | | | 370/352 |
| 2013/0254110 A1* | 9/2013 | Royyuru | G06Q 20/38 |
| | | | 705/44 |
| 2014/0059202 A1 | 2/2014 | David et al. | |
| 2014/0122097 A1 | 5/2014 | Taylor et al. | |
| 2015/0178708 A1 | 6/2015 | Reutov | |
| 2016/0062954 A1* | 3/2016 | Ruff | G06F 17/21 |
| | | | 715/249 |
| 2016/0092857 A1* | 3/2016 | Amos | G06Q 20/22 |
| | | | 705/39 |

\* cited by examiner

TRANSLATING DATA SIGNALS BETWEEN A FRONTEND INTERFACE AND A BACKEND SERVER

BACKGROUND

This disclosure relates to processing electronic signals transmitted through computer networks, and more specifically to translating data signals that are transmitted between computing devices.

At least some known payment processing networks for processing financial transactions enable client computing devices, for example client computers of acquiring banks and issuing banks, to view information about transactions processed through the payment processing network in an emulated terminal window. More specifically, conventional systems provide a limited interface for viewing transaction data that is based on a text-only terminal that is typically monochromatic and limited to 80 characters per line. The interface is limited because it interacts directly with a backend server that is configured to process payment transactions, rather than to provide a user-friendly interface for viewing information about the processed transactions. Accordingly, the appearance of the interface, the commands that can be issued to the interface, and the formatting of the responses to the commands can only be changed by directly modifying the programming of the backend server.

BRIEF DESCRIPTION OF THE DISCLOSURE

In one aspect, a data signal translation device for translating a data signal between a frontend interface and a backend server that is in communication with a processing network is provided. The data signal translation device is configured to receive a data signal including command data in a first format through a frontend interface coupled to a client computing device. The command data is associated with a command to perform an operation associated with the processing of payment transactions through the processing network by the backend server. Additionally, the data signal translation device is configured to translate the command data from the first format to a second format that is different from the first format. Further, the data signal translation device is configured to apply the translated command data to at least one replaceable logic module stored in the data signal translation device. The at least one replaceable logic module verifies that the translated command data is formatted pursuant to at least one stored rule associated with the operation of the backend server and generates a function call to the backend server based on the translated command data. Additionally, the data signal translation device is configured to transmit the function call to the backend server, whereby the backend server performs the operation without requiring the client computing device to communicate in the second format.

In another aspect, a method for translating a data signal between a frontend interface and a backend server that is in communication with a processing network is provided. The method is implemented by a data signal translation device coupled to a memory device and to a backend server network. The method includes receiving a data signal including command data in a first format through a frontend interface coupled to a client computing device. The command data is associated with a command to perform an operation associated with the processing of payment transactions through the processing network by the backend server. Additionally, the method includes translating the command data from the first format to a second format that is different from the first format. The method additionally includes applying the translated command data to at least one replaceable logic module stored in the data signal translation device. The at least one replaceable logic module verifies that the translated command data is formatted pursuant to at least one stored rule associated with the operation of the backend server and generates a function call to the backend server based on the translated command data. Additionally, the method includes transmitting the function call to the backend server, whereby the backend server performs the operation without requiring the client computing device to communicate in the second format.

In yet another aspect, a computer-readable storage medium having computer-executable instructions embodied thereon is provided. When executed by a one or more processors of a data signal translation device coupled to a memory device and to a backend server of a processing network, the computer-executable instructions cause the data signal translation device to receive a data signal including command data in a first format through a frontend interface coupled to a client computing device. The command data is associated with a command to perform an operation associated with the processing of payment transactions through the processing network by the backend server. Additionally, the instructions cause the data signal translation device to translate the command data from the first format to a second format that is different from the first format and apply the translated data to at least one replaceable logic module stored in the data signal translation device. The at least one replaceable logic module verifies that the translated command data is formatted pursuant to at least one stored rule associated with the operation of the backend server and generates a function call to the backend server based on the translated command data. Additionally, the instructions cause the data signal translation device to transmit the function call to the backend server, whereby the backend server performs the operation without requiring the client computing device to communicate in the second format.

BRIEF DESCRIPTION OF THE DRAWINGS

FIG. 1 is a schematic diagram illustrating an enhanced multi-party payment card industry system for enabling payment-by-card transactions in which merchants and card issuers do not necessarily have a one-to-one relationship, and for translating data signals between a frontend interface and a backend server.

FIG. 2 is a simplified block diagram of an example payment processing system including a payment processing server computing device, a data signal translation device, and a plurality of computing devices in accordance with one example embodiment of the present disclosure.

FIG. 3 is an expanded block diagram of a server architecture of the payment processing system including the plurality of computing devices in accordance with one example embodiment of the present disclosure.

FIG. 4 illustrates a configuration of a client system shown in FIGS. 2 and 3 in accordance with one example embodiment of the present disclosure.

FIG. 5 illustrates a configuration of a server system shown in FIGS. 2 and 3 in accordance with one example embodiment of the present disclosure.

FIG. 6 is a diagram of electronic data signals received and transmitted in an environment in which the data signal translation device operates.

FIG. 7 is a flowchart of an example process implemented by the data signal translation device for translating a data signal between a frontend interface and a backend server in one example embodiment of the present disclosure.

FIG. 8 is a diagram of components of one or more example computing devices that may be used in the system shown in FIG. 2.

DETAILED DESCRIPTION OF THE DISCLOSURE

Figure 1:
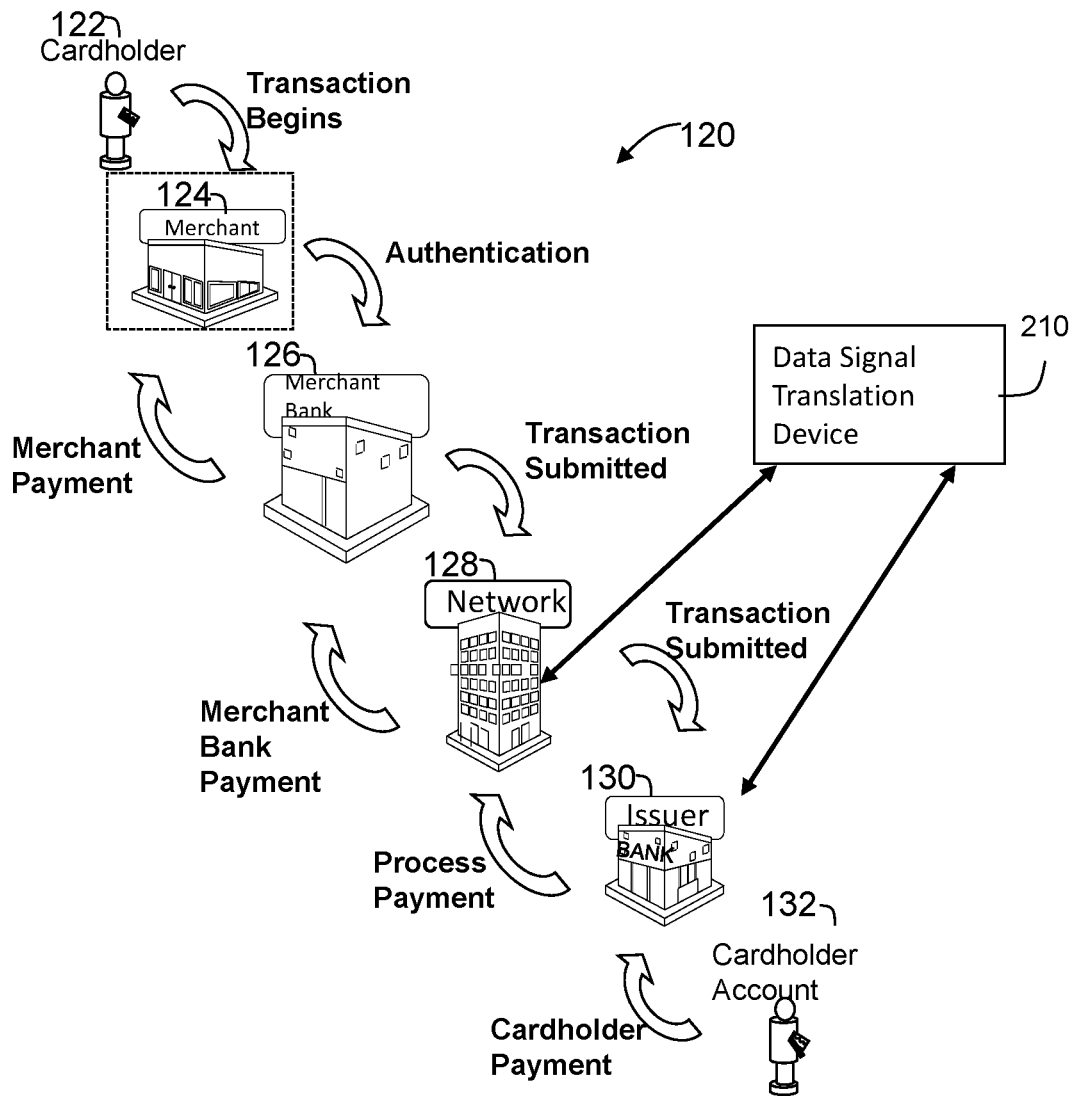
FIGS. 1-8 show example embodiments of the methods and systems described herein.

A data signal translation device is described herein. The data signal translation device solves the limitations of conventional systems described above by translating between a frontend interface that provides customers with a web-enabled, user-friendly interface to data processed and stored by the backend server, and the backend server itself. Additionally, the data signal translation device enables logic modules to be added, removed, and/or replaced to change or extend features available to customers, without impacting the backend server. The data signal translation device translates a data signal between the frontend interface and the backend server, which is in communication with a payment network. The data signal translation device is configured to receive a data signal including command data in a first format through the frontend interface, which is coupled to a client computing device. The command data is associated with a command to perform an operation associated with the processing of payment transactions through the payment network by the backend server. The data signal translation device is further configured to translate the data from the first format to a second format that is different from the first format. For example, the first format is a web-related format and the second format is a format that the backend server is configured to process. The data signal translation device is additionally configured to apply the translated data to at least one replaceable logic module stored in the data signal translation device. The at least one replaceable logic module verifies that the data is formatted pursuant to at least one stored rule associated with the operation of the backend server and generates a function call to the backend server based on the translated data. More specifically, the data signal translation device includes a business logic layer that includes one or more modules for applying stored rules to a command. The logic modules are configured to be added, removed, and/or replaced without affecting the operations of the backend server. The rules include, for example, determining whether the command includes a complete set of parameters needed by the backend server to process the command (e.g., a date range and/or an account identifier for retrieving a transaction history). Additionally, the data signal translation device is configured to transmit the function call to the backend server.

In some implementations, the data signal translation device is further configured to receive a second data signal from the backend server. The second data signal includes response data associated with a response to the command. Additionally, the data signal translation device translates the response data from the second format to the first format and transmits the response to the frontend interface.

In some embodiments, the data signal includes command data associated with a command to view an adjustment to at least one payment transaction processed through the payment network. In some implementations, the command data is associated with a command to view at least one transaction flagged as fraudulent. Also, in some implementations, the data signal translation device includes the frontend interface. The frontend interface includes a web server configured to transmit at least one web page to a client computing device communicatively coupled to the web server. In other implementations, the frontend interface includes an application programming interface (API) configured to communicate with an application operating on a client computing device that is communicatively coupled to the frontend interface. In some implementations, the data signal translation device is configured to receive an additional replaceable logic module, receive a second data signal, determine that the second data signal includes second data associated with the additional replaceable logic module, and apply the second data to the additional replaceable logic module. In some embodiments, the data signal translation device is further configured to receive command data associated with one or more single message transactions processed through the payment network.

The problem addressed by the systems and methods described herein is rooted in computer technology. More specifically, the systems and methods described herein enable a client computing device to issue commands to a server computing device and receive responses from the server computing device without being able to communicate the commands in a format that the server is configured to process. Accordingly, the client computing device is able to provide a user interface that is not restricted by the data formats understood by the server computing device.

The methods and systems described herein may be implemented using computer programming or engineering techniques including computer software, firmware, hardware or any combination or subset thereof, wherein the technical effect is achieved by performing at least one of: (a) receiving a data signal including command data in a first format through a frontend interface coupled to a client computing device, the command data associated with a command to perform an operation associated with the processing of payment transactions through the processing network by the backend server; (b) translating the command data from the first format to a second format that is different from the first format; (c) applying the translated command data to at least one replaceable logic module stored in the data signal translation device, wherein the at least one replaceable logic module verifies that the translated command data is formatted pursuant to at least one stored rule associated with the operation of the backend server and generates a function call to the backend server based on the translated command data; and (d) transmitting the function call to the backend server, whereby the backend server performs the operation without requiring the client computing device to communicate in the second format. More specifically, systems and methods described herein provide a technical advantage by eliminating the limitations of conventional systems that provide a limited, non-extensible interface to backend servers. More specifically, the systems and methods described herein translate between a frontend interface that provides an extensible, web-enabled, user-friendly interface to a backend server. Additionally, the systems and methods described herein enable logic modules to be added, removed, and/or replaced to change or extend features available to client computing devices that interact with the backend server, without requiring reconfiguration of the backend server.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a gift card, and/or any other device that may hold payment account information, such as mobile phones, smartphones, personal digital assistants (PDAs), key fobs, and/or computers. Each type of transaction card can be used as a method of payment for performing a transaction.

In one embodiment, a computer program is provided, and the program is embodied on a computer-readable medium. In an example embodiment, the system is executed on a single computer system, without requiring a connection to a sever computer. In a further example embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of AT&T located in New York, N.Y.). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

The following detailed description illustrates embodiments of the disclosure by way of example and not by way of limitation. It is contemplated that the disclosure has general application to processing financial transaction data by a third party in industrial, commercial, and residential applications.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

FIG. 1 is a schematic diagram illustrating an enhanced multi-party payment card system 120 for enabling payment-by-card transactions in which merchants and card issuers do not necessarily have a one-to-one relationship and for translating data signals between a frontend interface and a backend server. The present disclosure relates to an enhancement of a payment card system 120, such as a credit card payment system using the MasterCard® payment card system payment network 128 (also referred to as an "interchange" or "interchange network"). MasterCard® payment card system payment network 128 is a proprietary communications standard promulgated by MasterCard International Incorporated® for the exchange of financial transaction data between financial institutions that are members of MasterCard International Incorporated®. (MasterCard is a registered trademark of MasterCard International Incorporated located in Purchase, New York).

In payment card system 120, a financial institution such as an issuer 130 issues a payment account card, such as a credit card account or a debit card account, to a cardholder 122, who uses the payment account card to tender payment for a purchase from a merchant 124. To accept payment with the payment account card, merchant 124 must normally establish an account with a financial institution that is part of the financial payment system. This financial institution is usually called the "merchant bank" or the "acquiring bank" or "acquirer bank" or simply "acquirer". When a cardholder 122 tenders payment for a purchase with a payment account card (also known as a financial transaction card), merchant 124 requests authorization from acquirer 126 for the amount of the purchase. The request may be performed over the telephone, but is usually performed through the use of a point-of-interaction terminal, which reads the cardholder's account information from the magnetic stripe on the payment account card or EMV chip and communicates electronically with the transaction processing computers of acquirer 126. Alternatively, acquirer 126 may authorize a third party to perform transaction processing on its behalf. In this case, the point-of-interaction terminal will be configured to communicate with the third party. Such a third party is usually called a "merchant processor" or an "acquiring processor." In some instances, a merchant (e.g., merchant 124) stores payment card information associated with a cardholder (e.g., cardholder 122) and requests authorization from acquirer 126 using the stored payment card information, rather than reading the cardholder's account information from the payment card itself (i.e., a card-on-file (COF) transaction).

Using payment card system payment network 128, the computers of acquirer 126 or the merchant processor will communicate with the computers of issuer 130, to determine whether the cardholder's account 132 is in good standing and whether the purchase is covered by the cardholder's available credit line or account balance. Based on these determinations, the request for authorization will be declined or accepted. If the request is accepted, an authorization code is issued to merchant 124.

When a request for authorization is accepted, the available credit line or available balance of cardholder's account 132 is decreased. Normally, a charge is not posted immediately to a cardholder's account because bankcard associations, such as MasterCard International Incorporated®, have promulgated rules that do not allow a merchant to charge, or "capture," a transaction until goods are shipped or services are delivered. When a merchant ships or delivers the goods or services, merchant 124 captures the transaction by, for example, appropriate data entry procedures on the point-of-interaction terminal. If a cardholder cancels a transaction before it is captured, a "void" is generated. If a cardholder returns goods after the transaction has been captured, a "credit" is generated.

For PIN debit card transactions, when a request for authorization is approved by the issuer, the cardholder's account 132 is decreased. Normally, a charge is posted immediately to cardholder's account 132. The bankcard association then transmits the approval to the acquiring processor for distribution of goods/services, or information or cash in the case of an ATM.

After a transaction is captured, the transaction is cleared and settled between merchant 124, acquirer 126, and issuer 130. Clearing refers to the communication of financial data for reconciliation purposes between the parties. Settlement refers to the transfer of funds between the merchant's account, acquirer 126, and issuer 130 related to the transaction.

In some implementations, computing devices of issuer 130 communicate with a data signal translation device 210 to view information about transactions processed by payment network 128 and to issue commands to computing devices of payment network 128. As described in more detail herein, data signal translation device 210 enables issuer 130 to interface with backend servers of payment network 128 using a web page and/or an application. The data signal translation device 210 translates data signals formatted in a first format associated with the web page and/or application to a second format that is understood by the backend servers. Additionally, as described in more detail herein, data signal translation device 210 applies data from the received signals from the issuer 130 to one or more replaceable logic modules that detect whether parameters included in the data comply with a set of predefined rules associated with one or more functions of the backend servers. If the parameters are not in compliance with the predefined rules, the one or more replaceable logic modules adjust the parameters or generate an error message. In some implementations, data signal translation device 210 stores the error message in a database. In some implementations, data signal translation device 210 transmits the error message to the issuer computing device (e.g., to the web page and/or application). In some implementations, data signal translation device 210 communicates with and performs similar functions with computing devices of a merchant (e.g., merchant 124) and/or an acquiring bank (e.g., acquirer 126).

Figure 2:
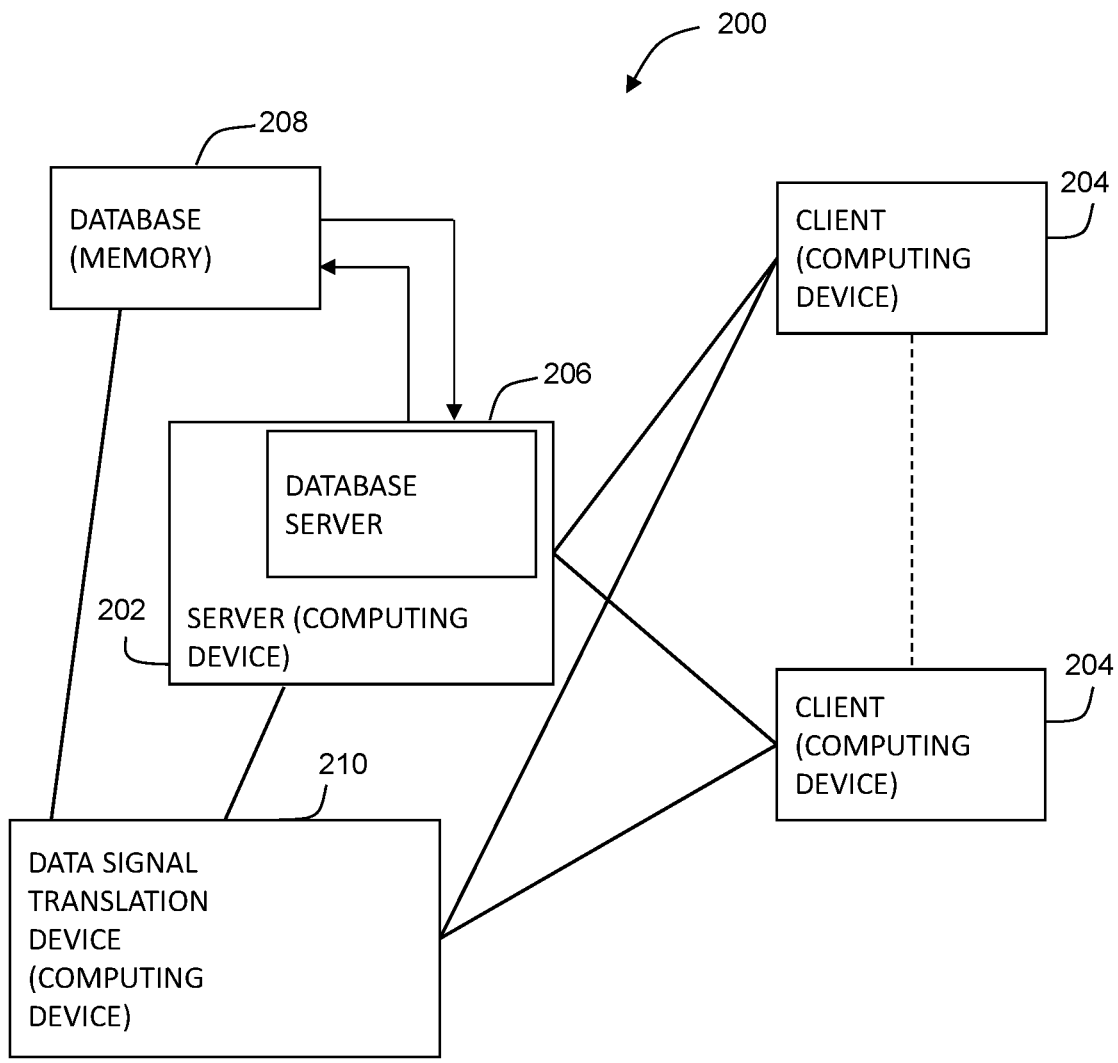

FIG. 2 is a simplified block diagram of an example payment processing system 200 in accordance with one embodiment of the present disclosure. In the example embodiment, system 200 includes a payment processing server computing device 202, a plurality of client subsystems, also referred to as client systems 204 or client computing devices, connected to payment processing server computing device 202, and a data signal translation device 210. As described in more detail with reference to FIG. 3, client systems 204 include computer systems of merchants (e.g., merchant 124), computer systems of acquirers (e.g., acquirer 126), and computer systems of one or more issuers (e.g., issuer 130). In one embodiment, client systems 204 are computers including a web browser, such that payment processing server computing device 202 and/or data signal translation device 210 are accessible to client systems 204 using the Internet. In other implementations, client systems 204 communicate with data signal translation device 210 using an application running locally on the client systems 204 and transmitting function calls to an application programming interface (API) executed by data signal translation device 210. Client systems 204 are interconnected to the Internet through many interfaces including a network, such as a local area network (LAN) and/or a wide area network (WAN), dial-in connections, cable modems, wireless-connections, and special high-speed ISDN lines. Client systems 204 may be any device capable of interconnecting to the Internet including a mobile computing device, such as a notebook computer, a web-based phone, a personal digital assistant (PDA), or other web-connectable equipment.

In one embodiment, client computing device 204 includes a point-of-sale (POS) device, a cardholder computing device (e.g., a smartphone, a tablet, or other computing device), or any other computing device capable of communicating with payment processing server computing device 202. A database server 206 is connected to a database 208 containing information on a variety of matters, as described below in greater detail. In one embodiment database 208 is stored on payment processing server computing device 202 and may be accessed by potential users at one of client systems 204 by logging onto payment processing server computing device 202 through one of client systems 204. In any alternative embodiment, database 208 is stored remotely from payment processing server computing device 202 and may be non-centralized. In at least some implementations, as described in more detail herein, data signal translation device 210 stores data to, and retrieves data from, database 208.

Figure 3:
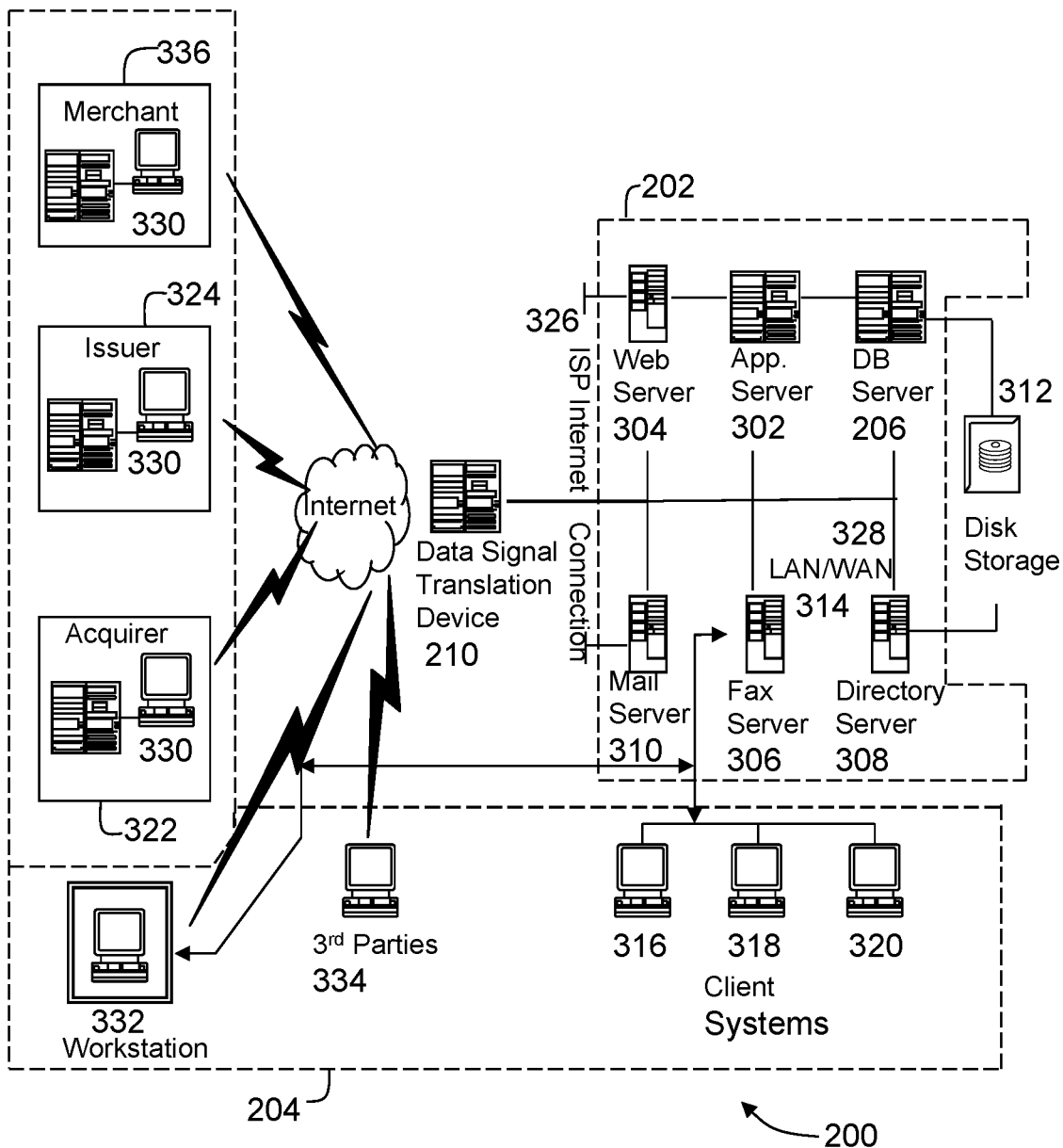

FIG. 3 is an expanded block diagram of an example embodiment of a server architecture of payment processing system 200 in accordance with one embodiment of the present disclosure. Payment processing system 200 includes payment processing server computing device 202, client systems 204, and data signal translation device 210. Payment processing server computing device 202 includes database server 206, an application server 302, a web server 304, a fax server 306, a directory server 308, and a mail server 310. A disk storage unit 312 is coupled to database server 206 and directory server 308. Servers 206, 302, 304, 306, 308, and 310 are coupled in a local area network (LAN) 314. In addition, a system administrator's workstation 316, a user workstation 318, and a supervisor's workstation 320 are coupled to LAN 314. Alternatively, workstations 316, 318, and 320 are coupled to LAN 314 using an Internet link or are connected through an Intranet. In some implementations, data signal translation device 210 is remote from payment processing server computing device 202 but communicatively coupled thereto. In other implementations, data signal translation device 210 is incorporated into payment processing server computing device 202.

Each workstation, 316, 318, and 320, is a personal computer having a web browser or an application configured to interact with payment processing server computing device 202 directly or through data signal translation device 210. Communications between client systems 204 and data signal translation device 210 are described in more detail herein. Although the functions performed at the workstations typically are illustrated as being performed at respective workstations 316, 318, and 320, such functions can be performed at one of many personal computers coupled to LAN 314. Workstations 316, 318, and 320 are illustrated as being associated with separate functions only to facilitate an understanding of the different types of functions that can be performed by individuals having access to LAN 314.

Payment processing server computing device 202 is configured to be communicatively coupled to various entities, including acquirers 322, issuers 324, and to third parties 334 (e.g., auditors) using an Internet connection 326. Server system 202 is also communicatively coupled with one or more merchants 336. The communication in the example embodiment is illustrated as being performed using the Internet, however, any other wide area network (WAN) type communication can be utilized in other embodiments, i.e., the systems and processes are not limited to being practiced using the Internet. In addition, and rather than WAN 328, local area network 314 could be used in place of WAN 328. As described above, in some implementations, data signal translation device 210 is remote from payment processing server computing device 202 but communicatively coupled thereto. In other implementations, data signal translation device 210 is incorporated into payment processing server computing device 202. As described in more detail herein, in some implementations, data signal translation device 210 operates as an intermediary between client systems 204 and payment processing server computing device 202. More specifically, data signal translation device 210 receives commands from client systems 204 in a first format that is associated with a web page or software application, translates the command from the first format to a second format that is understood by payment processing server computing device 202, applies the command to one or more replaceable logic units that determine whether parameters of the command are compatible with functions of the payment processing server computing device 202, and transmits one or more corresponding function calls to payment processing server computing device 202. Data signal translation device 210 also receives responses from the payment processing server computing device 202, converts the responses from the second format to the first format, and transmits the responses to the corresponding client computing devices 204.

In the example embodiment, any authorized individual or entity having a workstation 330 may access system 200. At least one of the client systems includes a manager workstation 332 located at a remote location. Workstations 330 and 332 include personal computers having a web browser. Furthermore, fax server 306 communicates with remotely located client systems, including a client system 332, using a telephone link. Fax server 306 is configured to communicate with other client systems 316, 318, and 320 as well.

Figure 4:
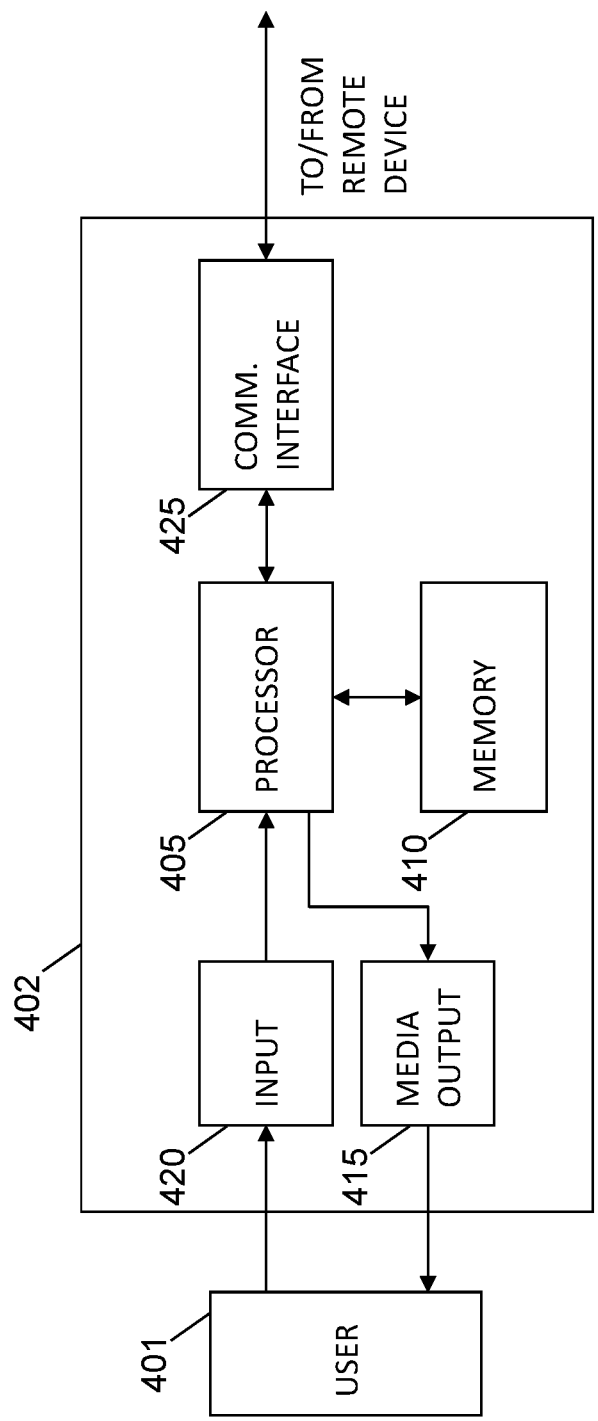

FIG. 4 illustrates an example configuration of a client computing device 402. Client computing device 402 may include, but is not limited to, client systems ("client computing devices") 204, 316, 318, 320, 330, manager workstation 332, and third party computing devices 334 (shown in FIG. 3).

Client computing device 402 includes a processor 405 for executing instructions. In some embodiments, executable instructions are stored in a memory area 410. Processor 405 may include one or more processing units (e.g., in a multi-core configuration). Memory area 410 is any device allowing information such as executable instructions and/or other data to be stored and retrieved. Memory area 410 may include one or more computer-readable media.

Client computing device 402 also includes at least one media output component 415 for presenting information to a user 401 (e.g., a cardholder 122). Media output component 415 is any component capable of conveying information to user 401. In some embodiments, media output component 415 includes an output adapter such as a video adapter and/or an audio adapter. An output adapter is operatively coupled to processor 405 and operatively coupleable to an output device such as a display device (e.g., a liquid crystal display (LCD), organic light emitting diode (OLED) display, cathode ray tube (CRT), or "electronic ink" display) or an audio output device (e.g., a speaker or headphones).

In some embodiments, client computing device 402 includes an input device 420 for receiving input from user 401. Input device 420 may include, for example, a keyboard, a pointing device, a mouse, a stylus, a touch sensitive panel (e.g., a touch pad or a touch screen), a camera, a gyroscope, an accelerometer, a position detector, and/or an audio input device. A single component such as a touch screen may function as both an output device of media output component 415 and input device 420.

Client computing device 402 may also include a communication interface 425, which is communicatively coupleable to a remote device such as server system 202 or a web server operated by a merchant. Communication interface 425 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 410 are, for example, computer-readable instructions for providing a user interface to user 401 via media output component 415 and, optionally, receiving and processing input from input device 420. A user interface may include, among other possibilities, a web browser and client application. Web browsers enable users 401 to display and interact with media and other information typically embedded on a web page or a website hosted by a web server (e.g., web server 304 and/or data signal translation device 210). A client application allows users 401 to interact with an application server (e.g., application server 302 and/or data signal translation device 210).

Figure 5:
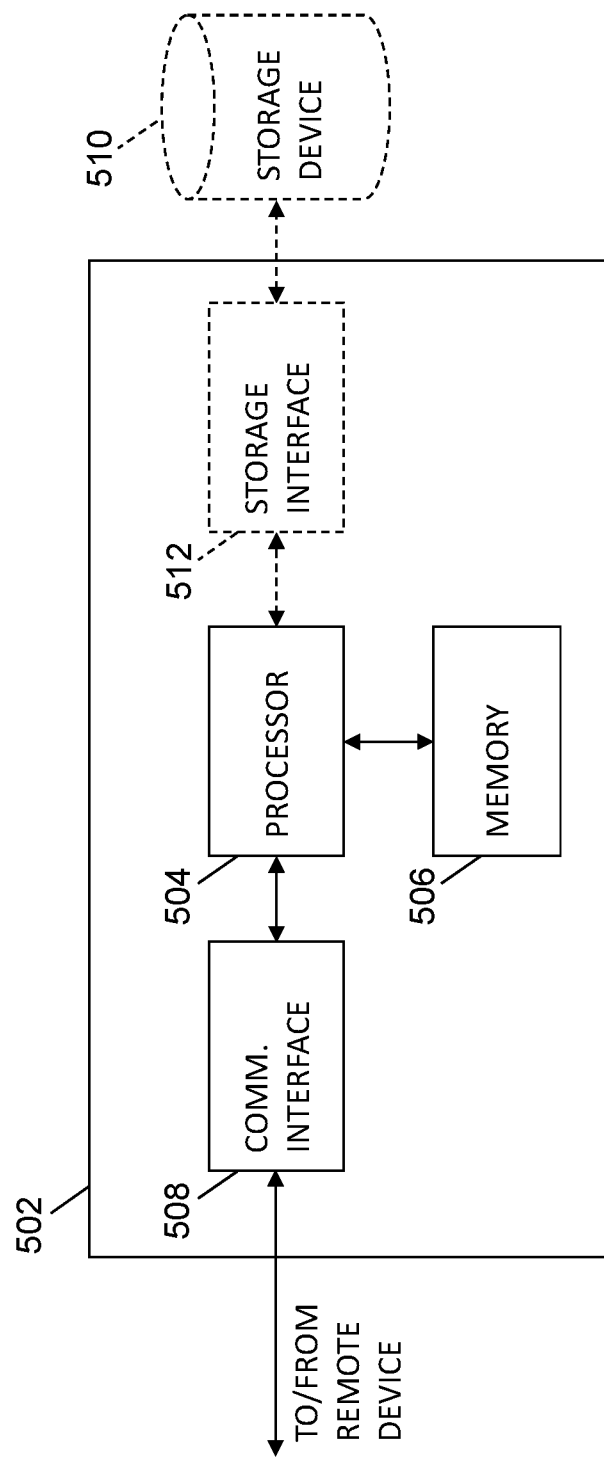

FIG. 5 illustrates an example configuration of a server computing device 502. Server computing device 502 is representative of payment processing server computing device 202 (shown in FIGS. 2 and 3), database server 206, application server 302, web server 304, fax server 306, directory server 308, mail server 310, and one or more computing devices included in data signal translation device 210.

Server computing device 502 includes a processor 504 for executing instructions. Instructions may be stored in a memory area 506, for example. Processor 504 may include one or more processing units (e.g., in a multi-core configuration).

Processor 504 is operatively coupled to a communication interface 508 such that server computing device 502 is capable of communicating with a remote device such as client computing device 402 or another server computing device 502. For example, communication interface 508 may receive requests from client systems 204 via the Internet, as illustrated in FIGS. 2 and 3.

Processor 504 may also be operatively coupled to a storage device 510. Storage device 510 is any computer-operated hardware suitable for storing and/or retrieving data. In some embodiments, storage device 510 is integrated in server computing device 502. For example, server computing device 502 may include one or more hard disk drives as storage device 510. In other embodiments, storage device 510 is external to server computing device 502 and may be accessed by a plurality of server computing devices 502. For example, storage device 510 may include multiple storage units such as hard disks or solid state disks in a redundant array of inexpensive disks (RAID) configuration. Storage device 510 may include a storage area network (SAN) and/or a network attached storage (NAS) system.

In some embodiments, processor 504 is operatively coupled to storage device 510 via a storage interface 512. Storage interface 512 is any component capable of providing processor 504 with access to storage device 510. Storage interface 512 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 504 with access to storage device 510.

Memory areas 410 and 506 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are example only, and are thus not limiting as to the types of memory usable for storage of a computer program.

Figure 6:
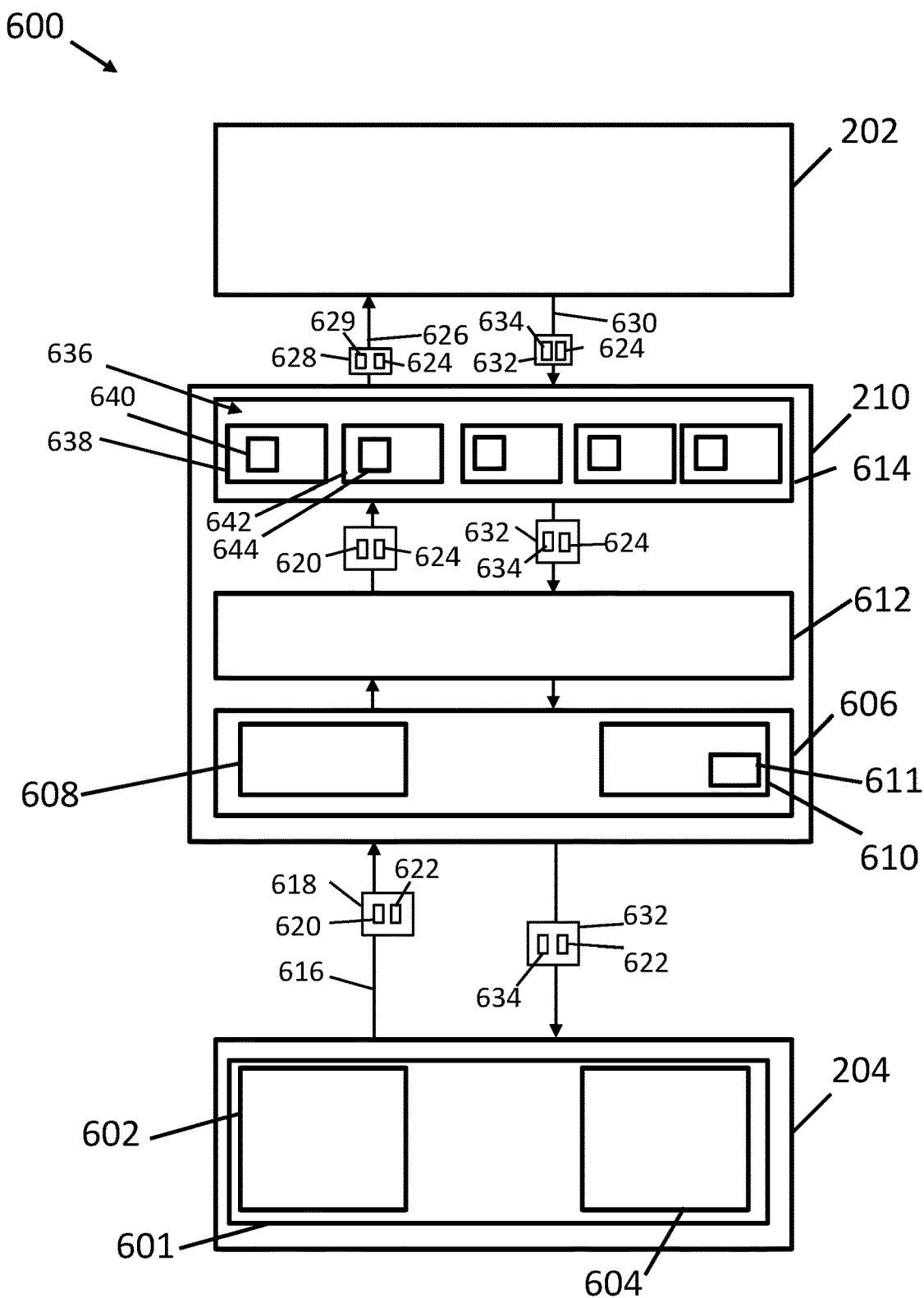

FIG. 6 is a diagram of electronic data signals received and transmitted in an environment 600 in which the data signal translation device 210 operates. More specifically, a client computing device 204, for example a computing device of an issuer 324 communicates with data signal translation device 210 using a graphical user interface 601. In some implementations, graphical user interface 601 includes a web page 602 displayed by client computing device 204 (e.g., in a web browser). In other implementations, graphical user interface 601 includes an application 604 executed by client computing device 204. Rather than displaying information from payment processing server 202 ("backend server") in a text-only terminal window, client computing device 204 displays information from backend server 202 in a graphical user interface (e.g., web page 602 and/or application 604). Notably, while client computing device 204 displays a graphical user interface for interaction with backend server 202, backend server 202 is not configured to receive commands from, or transmit information formatted for, a graphical user interface. Rather, data signal translation device 210 operates as an intermediary that converts data signals transmitted between client computing device 204 and backend server 202 to enable such interaction.

Data signal translation device 210 includes a frontend interface 606. In some implementations, frontend interface 606 includes a web server 608, similar to web server 304 (FIG. 3). Web server 608 transmits and receives data with client computing device 204 using, for example, hypertext transfer protocol (HTTP) and/or hypertext transfer protocol secure (HTTPS), to enable client computing device 204 to transmit and receive data through web page 602. In some implementations, frontend interface 606 includes an application server 610, similar to application server 302 (FIG. 3). Application server 610 implements an application programming interface (API) 611 that defines functions for transmitting and receiving data to and from application 604 executing on client computing device 204.

Data signal translation device 210 additionally includes a reformatting component 612 that converts data between a first format associated with frontend interface 606 and graphical user interface 601 and a second format associated with (e.g., understood by) backend server 202. Additionally, data signal translation device 210 includes a logic component 614 that includes a plurality of replaceable logic modules 636. More specifically, replaceable logic modules 636 include a first replaceable logic module 638 that applies a first set of rules 640 to received data, and a second replaceable logic module 642 that applies a second set of rules 644 to received data.

As an example operation, client computing device 204 transmits a command signal 616 to data signal translation device 210. For example, client computing device 204 transmits command signal 616 based on a user's interaction with web page 602 displayed by client computing device 204. Command signal 616 includes a command 618, for example, a command to review a transaction history associated with an account. Command 618 includes command data 620, for example, a date range and an identifier of the account. Command data 620 is formatted according to a first format 622, for example, a message formatted according to representational state transfer (REST) external view. Reformatting component 612 translates command data 620 from first format 622 to a second format 624. Second format 624 includes, for example, a data transfer object (DTO). In some implementations, reformatting component 612 first converts the REST external view message to a REST internal view message, then converts the REST internal view message to a data transfer object (e.g., second format 624).

Logic component 614 within data signal translation device 210 receives command data 620 formatted in the second format 624, determines a category that the command data 620 pertains to, and applies the rules of at least one of replaceable logic modules 636 to command data 620, based on the determined category of command data 620. More specifically, for example, logic component 614 determines that command data 620 specifies a request for an exception transaction history associated with a set of parameters identifying a specific account, and a date range including a first date and a second date. Accordingly, logic component 614 applies first replaceable logic module 638 to command data 620. First replaceable logic module 638 applies first rules 640 to command data 620. More specifically, first replaceable logic module 638 determines, for example, whether the account specified in command data 620 has a predefined format, such as a predefined number of characters and/or digits, or includes a predefined prefix or suffix. In at least some implementations, if the specified account does not have the predefined format, first replaceable logic module 638 prepends the predefined prefix, appends the predefined suffix, and/or adds padding data (e.g., leading or trailing digits) to cause the specified account to match the predefined format. Additionally, in at least some implementations, first replaceable logic module 638 determines whether the first date and the second date fall within a predefined date range. For example, if the second date specifies a date that is later than the current date (e.g., the date on which first replaceable logic module 638 receives command data 620), then first replaceable logic module replaces the second date with the current date. By evaluating and potentially adjusting parameters in command data 620, logic component 614 generates function call data 629, described in more detail herein. In other implementations, rather than replacing or adjusting any parameters within command data 620, first replaceable logic module 638 generates an error message and data signal translation device 210 transmits the error message back to client computing device 204.

Data signal translation device 210 then generates and transmits a function call signal 626 to backend server 202. Function call signal 626 includes a function call 628, for example a Java remote method invocation (RMI). Function call 628 includes function call data 629, generated by logic component 614, as described above. Backend server 202 is configured to process function calls having data (e.g., function call data 629) formatted according to second format 624 (e.g., DTO), rather than first format 622 (e.g., REST). Backend server 202 processes function call 628, for example by querying database 208 based on function call data 629, and generates a response signal 630 including a response 632. Response 632 includes response data 634 (e.g., query results) formatted according to second format 624 (e.g., DTO). Data signal translation device 210 then converts response data 634 to first format 622 and transmits response data 634 to client computing device 204 for presentation thereon (e.g., in web page 602 or application 604). Accordingly, data signal translation device 210 enables client computing device 204 to communicate with backend server 202 even though client computing device 204 communicates using first format 622, which is different than second format 624 used by backend server 202.

Figure 7:
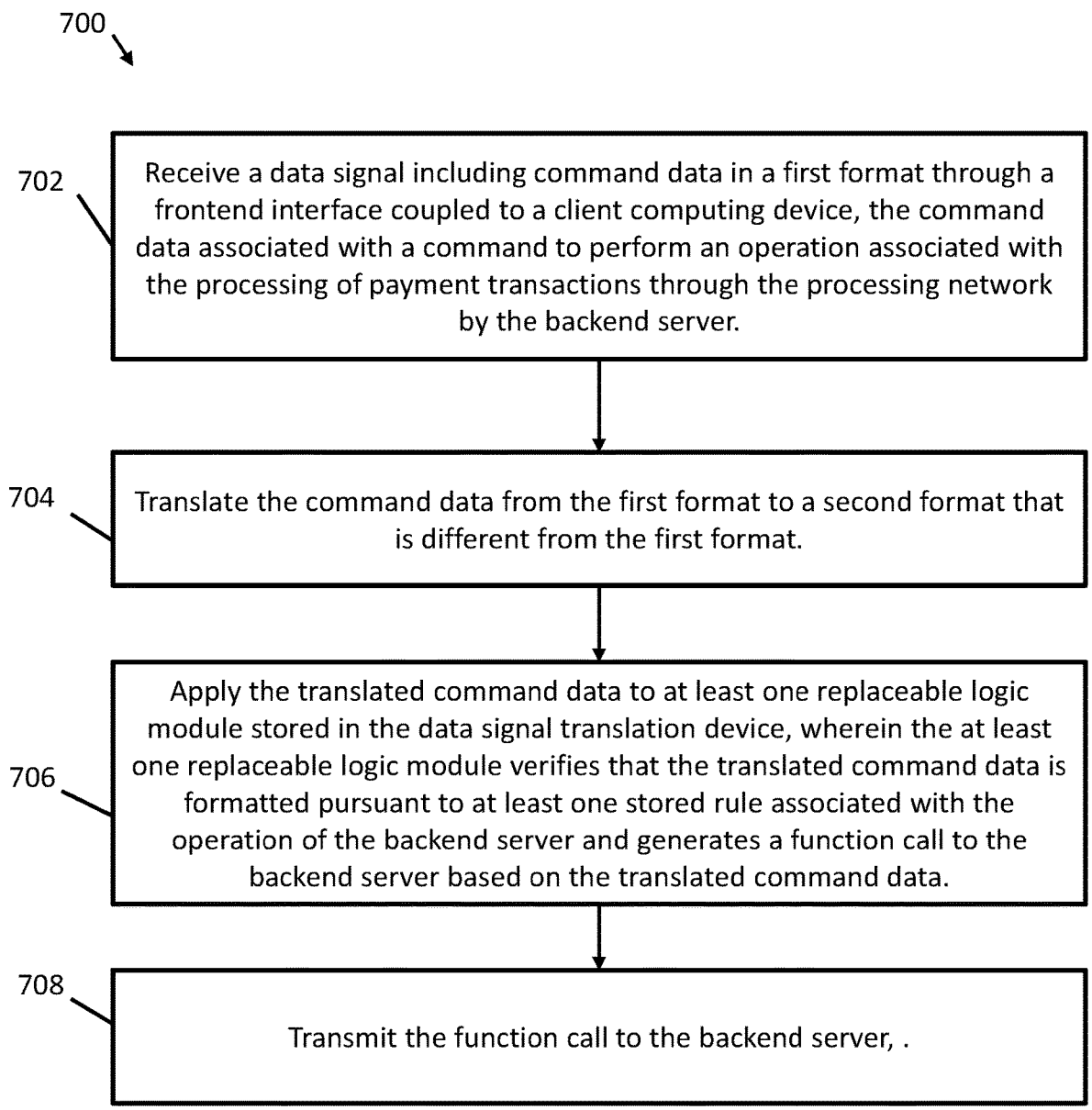

FIG. 7 is a flowchart of an example process 700 implemented by data signal translation device 210 for translating a data signal between a frontend interface (e.g., frontend interface 606) and a backend server (e.g., backend server 202) that is in communication with a processing network (e.g., payment card system payment network 128) in one example embodiment of the present disclosure. Initially, data signal translation device 210 receives 702 a data signal (e.g., command signal 616) including command data (e.g., command data 620) in a first format (e.g., first format 622) through a frontend interface (e.g., frontend interface 606) coupled to a client computing device (e.g., client computing device 204). The command data (e.g., command data 620) is associated with a command (e.g., command 618) to perform an operation associated with the processing of payment transactions through the payment network (e.g., payment network 128) by the backend server (e.g., backend server 202). Additionally, data signal translation device 210 translates 704 the command data (e.g., command data 620) from the first format (e.g., first format 622) to a second format (e.g., second format 624) that is different from the first format (e.g., first format 622). Further, data signal translation device 210 applies 706 the translated command data (e.g., command data 620 in second format 624) to at least one replaceable logic module (e.g., first replaceable logic module 638 of plurality of replaceable logic modules 636) stored in data signal translation device 210. The at least one replaceable logic module (e.g., first replaceable logic module 638) verifies that the translated command data (e.g., command data 620) is formatted pursuant to at least one stored rule (e.g., first rules 640) associated with the operation of the backend server 202 and generates a function call (e.g., function call 628) to the backend server 202 based on the translated command data (e.g., command data 620). Additionally, data signal translation device 210 transmits 708 the function call (e.g., function call 628) to the backend server 202, whereby the backend server 202 performs the operation without requiring the client computing device 204 to communicate in the second format.

In some implementations, the data signal (e.g., command signal 616) is a first data signal and data signal translation device 210 is further configured to receive a second data signal (e.g., response signal 630) from the backend server 202. The second data signal (e.g., response signal 630) includes response data (e.g., response data 634) associated with a response (e.g., response 632) to the command (e.g., command 618). Data signal translation device 210 translates the response data (e.g., response data 634) from the second format (e.g., second format 624) to the first format (e.g., first format 622) and transmits the response (e.g., response 632) to the frontend interface (e.g., frontend interface 606). Further, in some implementations, data signal translation device 210 receives the data signal (e.g., command signal 616) including command data (e.g., command data 620) associated with a command to view an adjustment (e.g., adjustments section 810, shown in FIG. 8) to at least one payment transaction processed through the processing network (e.g., payment network 128).

In some implementations, data signal translation device 210 receives the data signal (e.g., command signal 616) including command data (e.g., command data 620) associated with a command to view a history of payment transactions (e.g., transaction histories section 812, shown in FIG. 8) processed through the processing network (e.g., payment network 128). Also, in some implementations, data signal translation device 210 receives the data signal (e.g., command signal 616) including command data (e.g., command data 620) associated with a command to view at least one transaction flagged as fraudulent (e.g., fraudulent transactions section 814, shown in FIG. 8).

In some implementations, frontend interface 606 includes a web server (e.g., web server 608) configured to transmit at least one web page (e.g., web page 602) to the client computing device (e.g., client computing device 204) communicatively coupled to the web server (e.g., web server 608). Additionally, in some implementations, frontend interface 606 includes an application programming interface (API) (e.g., API 611) configured to communicate with an application (e.g., application 604) operating on the client computing device (e.g., client computing device 204) that is communicatively coupled to the frontend interface 606.

In some implementations, data signal translation device 210 receives an additional replaceable logic module (e.g., second replaceable logic module 642), receives a second data signal (e.g., command signal 616), determines that the second data signal (e.g., command signal 616) includes second data (e.g., command data 620) associated with the additional replaceable logic module (e.g., second replaceable logic module 642), and applies the second data (e.g., command data 620) to the additional replaceable logic module (e.g., second replaceable logic module 642). Additionally, in some implementations, data signal translation device 210 receives the data signal (e.g., command signal 616) including command data (e.g., command data 620) associated with a single message transaction processed through the processing network (e.g., payment network 128).

Figure 8:
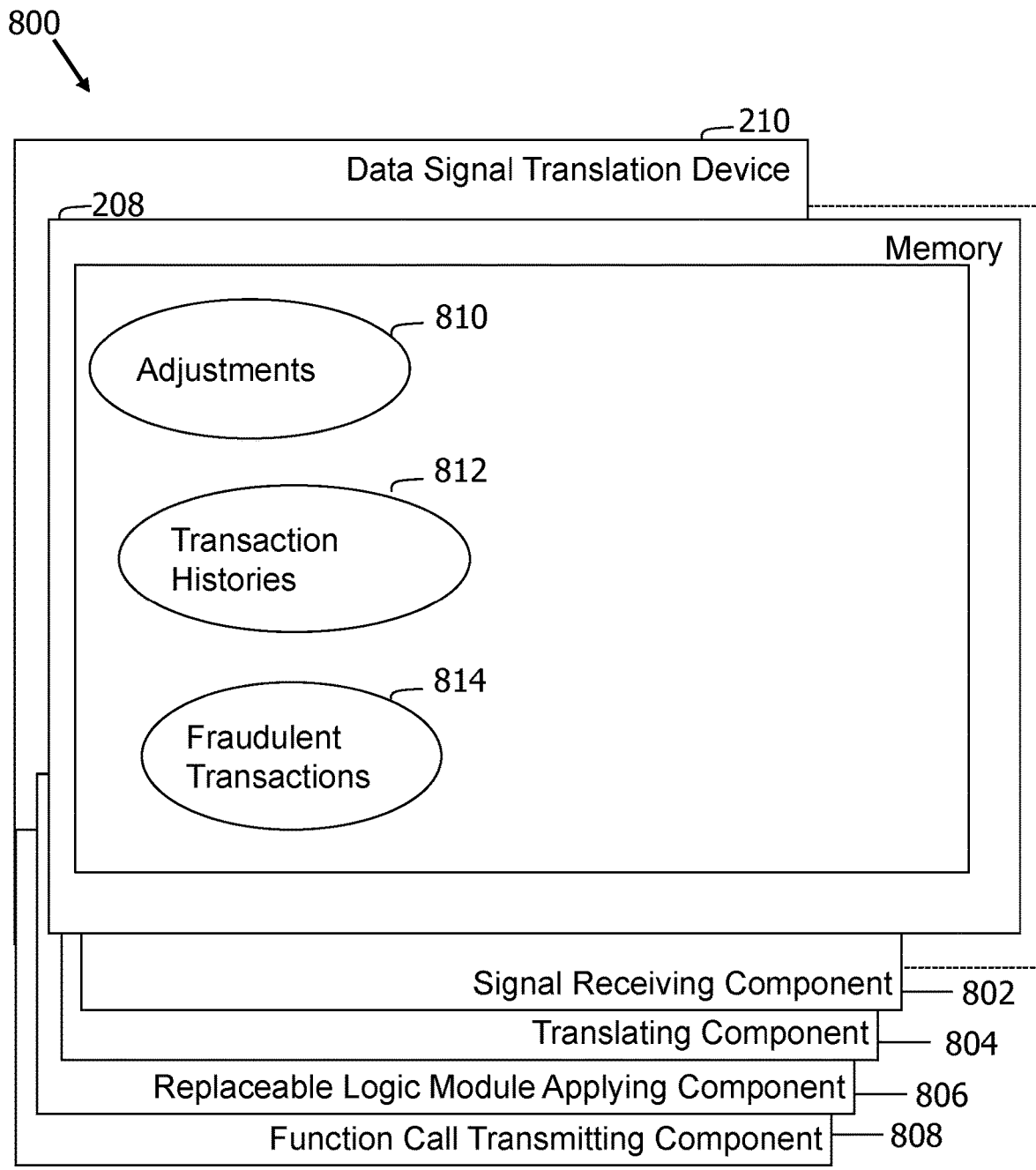

FIG. 8 is a diagram 800 of components of one or more example computing devices, for example data signal translation device 210, that may be used in embodiments of the described systems and methods. FIG. 8 further shows a configuration of data in database 208. Database 208 is in communication with several separate components within data signal translation device 210, which perform specific tasks.

Data signal translation device 210 includes a signal receiving component 802 that receives a data signal including command data in a first format through a frontend interface coupled to a client computing device. The command data is associated with a command to perform an operation associated with the processing of payment transactions through a processing network by the backend server. Additionally, data signal translation device 210 includes a translating component 804 that translates the command data from the first format to a second format that is different from the first format. Further, data signal translation device 210 includes a replaceable logic module applying component 806 that applies the translated command data to at least one replaceable logic module stored in the data signal translation device. The at least one replaceable logic module verifies that the translated command data is formatted pursuant to at least one stored rule associated with the operation of the backend server and generates a function call to the backend server based on the translated command data. Additionally, data signal translation device 210 includes a function call transmitting component 808 that transmits the function call to the backend server.

In an example embodiment, data in database 208 is divided into a plurality of sections, including but not limited to, an adjustments section 810 that includes payment transactions that are subject to adjustments, a transaction histories section 812, and a fraudulent transactions section 814 that includes payment transactions that have been flagged as fraudulent or potentially fraudulent. These sections stored in database 208 are interconnected to retrieve and store information in accordance with the functions and processes described above.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by processor 405, 504, including RAM memory, ROM memory, EPROM memory, EEPROM memory, and non-volatile RAM (NVRAM) memory. The above memory types are example only, and are thus not limiting as to the types of memory usable for storage of a computer program.

As will be appreciated based on the foregoing specification, the above-discussed embodiments of the disclosure may be implemented using computer programming or engineering techniques including computer software, firmware, hardware or any combination or subset thereof. Any such resulting computer program, having computer-readable and/or computer-executable instructions, may be embodied or provided within one or more computer-readable media, thereby making a computer program product, i.e., an article of manufacture, according to the discussed embodiments of the disclosure. These computer programs (also known as programs, software, software applications or code) include machine instructions for a programmable processor, and can be implemented in a high-level procedural and/or object-oriented programming language, and/or in assembly/machine language. As used herein, the terms "machine-readable medium," "computer-readable medium," and "computer-readable media" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium," "computer-readable medium," and "computer-readable media," however, do not include transitory signals (i.e., they are "non-transitory"). The term "machine-readable signal" refers to any signal used to provide machine instructions and/or data to a programmable processor.

The above-described systems and methods provide a data signal translation device that solves the limitations of conventional systems that provide a limited, non-extensible interface to backend servers. More specifically, the above-described systems and methods translate between a frontend interface that provides customers with a web-enabled, user-friendly interface to a backend server. Additionally, the above-described systems and methods enable logic modules to be added, removed, and/or replaced to change or extend features available to customers, without requiring reconfiguration of the backend server.

This written description uses examples, including the best mode, to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A data signal translation device for translating a data signal between a frontend interface and a backend server that is in communication with a processing network, said data signal translation device configured to:

receive a data signal including command data in a first format through a frontend interface coupled to a client computing device, the command data associated with a command to perform an operation associated with the processing of payment transactions through the processing network by the backend server;

translate the command data from the first format to a second format that is different from the first format;

apply the translated command data to at least one replaceable logic module stored in the data signal translation device, wherein the at least one replaceable logic module:

verifies that the translated command data is formatted pursuant to at least one stored rule associated with the operation of the backend server, the at least one stored rule including whether the translated command data includes a complete set of parameters needed by the backend server to process the translated command data;

when the verification is successful, generates a function call to the backend server based on the translated command data; and when the verification is unsuccessful, adjusts the translated command data to match the complete set of parameters needed by the backend server to process the translated command data and generates the function call; and transmit the function call to the backend server, whereby the backend server performs the operation without requiring the client computing device to communicate in the second format.

2. The data signal translation device of claim 1, wherein the data signal is a first data signal, said data signal translation device is further configured to:

receive a second data signal from the backend server, the second data signal including response data associated with a response to the command;

translate the response data from the second format to the first format; and transmit the response to the frontend interface.

3. The data signal translation device of claim 1, further configured such that receiving the data signal including command data further comprises receiving the data signal including command data associated with a command to view an adjustment to at least one payment transaction processed through the processing network.

4. The data signal translation device of claim 1, further configured such that receiving the data signal including command data further comprises receiving the data signal including command data associated with a command to view a history of payment transactions associated with a particular payment account that were processed through the processing network.

5. The data signal translation device of claim 1, further configured such that receiving the data signal including command data further comprises receiving the data signal including command data associated with a command to view at least one stored transaction flagged as fraudulent and stored in a database in communication with the backend server.

6. The data signal translation device of claim 1, further comprising the frontend interface, wherein said frontend interface includes a web server configured to transmit at least one web page to the client computing device communicatively coupled to the web server.

7. The data signal translation device of claim 1, further comprising the frontend interface, wherein said frontend interface includes an application programming interface (API) configured to communicate with an application operating on the client computing device that is communicatively coupled to the frontend interface.

8. The data signal translation device of claim 1, further configured to:
receive an additional replaceable logic module;
receive a second data signal;
determine that the second data signal includes second data associated with the additional replaceable logic module; and
apply the second data to the additional replaceable logic module.

9. The data signal translation device of claim 1, further configured such that receiving the data signal including command data further comprises receiving the data signal including command data associated with a single message transaction processed through the processing network.

10. The data signal translation device of claim 1, wherein the complete set of parameters needed by the backend server to process the translated command data includes an account identifier formatted in a predefined format and a date range including a first and second date.

11. The data signal translation device of claim 1, wherein the complete set of parameters needed by the backend server to process the translated command data includes an account identifier, wherein to adjust the translated command data to match the complete set of parameters needed by the backend server to process the translated command data, said data signal translation device is further configured to at least one of:
(i) prepend a predefined prefix,
(ii) append a predefined suffix, and
(iii) add padding data
to the account identifier to format the account identifier into a predefined format.

12. A method for translating a data signal between a frontend interface and a backend server that is in communication with a processing network, said method is implemented by a data signal translation device coupled to a memory device and to the backend server network, said method comprising:
receiving a data signal including command data in a first format through a frontend interface coupled to a client computing device, the command data associated with a command to perform an operation associated with the processing of payment transactions through the processing network by the backend server;
translating the command data from the first format to a second format that is different from the first format;
applying the translated command data to at least one replaceable logic module stored in the data signal translation device, wherein the at least one replaceable logic:
verifies that the translated command data is formatted pursuant to at least one stored rule associated with the operation of the backend server, the at least one stored rule including whether the translated command data includes a complete set of parameters needed by the backend server to process the translated command data;
when the verification is successful, generates a function call to the backend server based on the translated command data; and
when the verification is unsuccessful, adjusts the translated command data to match the complete set of parameters needed by the backend server to process the translated command data and generates the function call; and
transmitting the function call to the backend server, whereby the backend server performs the operation without requiring the client computing device to communicate in the second format.

13. The method of claim 12, further comprising:
receiving a second data signal from the backend server, the second data signal including response data associated with a response to the command;
translating the response data from the second format to the first format; and
transmitting the response to the frontend interface.

14. The method of claim 12, wherein receiving the data signal including command data further comprises receiving the data signal including command data associated with a command to view an adjustment to at least one payment transaction processed through the processing network.

15. The method of claim 10, wherein receiving the data signal including command data further comprises receiving the data signal including command data associated with a command to view a history of payment transactions associated with a particular payment account that were processed through the processing network.

16. The method of claim 12, wherein receiving the data signal including command data further comprises receiving the data signal including command data associated with a command to view at least one stored transaction flagged as fraudulent and stored in a database in communication with the backend server.

17. The method of claim 12, wherein the data signal translation device includes the frontend interface and the frontend interface includes a web server, said method further comprising transmitting at least one web page to the client computing device communicatively coupled to the web server.

18. The method of claim 12, wherein the data signal translation device includes the frontend interface and the frontend interface includes an application programming interface (API), said method further comprising communicating with an application operating on the client computing device using the API.

19. The method of claim 12, further comprising:
receiving an additional replaceable logic module;
receiving a second data signal;
determining that the second data signal includes second data associated with the additional replaceable logic module; and
applying the second data to the additional replaceable logic module.

20. The method of claim 12, wherein receiving the data signal including command data further comprises receiving the data signal including command data associated with a single message transaction processed through the processing network.

21. A computer-readable storage medium having computer-executable instructions embodied thereon, wherein when executed by a one or more processors of a data signal translation device coupled to a memory device and to a backend server of a processing network, the computer-executable instructions cause the data signal translation device to:
receive a data signal including command data in a first format through a frontend interface coupled to a client computing device, the command data associated with a command to perform an operation associated with the processing of payment transactions through the processing network by the backend server;

translate the command data from the first format to a second format that is different from the first format;

apply the translated data to at least one replaceable logic module stored in the data signal translation device, wherein the at least one replaceable logic module:

verifies that the translated command data is formatted pursuant to at least one stored rule associated with the operation of the backend server, the at least one stored rule including whether the translated command data includes a complete set of parameters needed by the backend server to process the translated command data;

when the verification is successful, generates a function call to the backend server based on the translated command data; and when the verification is unsuccessful, adjusts the translated command data to match the complete set of parameters needed by the backend server to process the translated command data and generates the function call; and transmit the function call to the backend server, whereby the backend server performs the operation without requiring the client computing device to communicate in the second format.

22. The computer-readable storage medium of claim 21, wherein said computer-readable instructions additionally cause the data signal translation device to:

receive a second data signal from the backend server, the second data signal including response data associated with a response to the command;

translate the response data from the second format to the first format; and transmit the response to the frontend interface.

* * * * *